Dec. 20, 1966     R. G. PIETY     3,293,542
ELECTRICAL WELL LOGGING APPARATUS INCLUDING A DRILL COLLAR
HAVING SPACED ELECTRODES MOUNTED THEREON FOR MAKING
RESISTIVITY MEASUREMENTS WHILE DRILLING
Filed March 18, 1963     2 Sheets-Sheet 1

INVENTOR.
R. G PIETY
BY Young & Quigg
ATTORNEYS

Dec. 20, 1966   R. G. PIETY   3,293,542
ELECTRICAL WELL LOGGING APPARATUS INCLUDING A DRILL COLLAR
HAVING SPACED ELECTRODES MOUNTED THEREON FOR MAKING
RESISTIVITY MEASUREMENTS WHILE DRILLING
Filed March 18, 1963   2 Sheets-Sheet 2

INVENTOR.
R. G. PIETY
BY *Young & Quigg*
ATTORNEYS

United States Patent Office 3,293,542
Patented Dec. 20, 1966

3,293,542
ELECTRICAL WELL LOGGING APPARATUS INCLUDING A DRILL COLLAR HAVING SPACED ELECTRODES MOUNTED THEREON FOR MAKING RESISTIVITY MEASUREMENTS WHILE DRILLING
Raymond G. Piety, Bartlesville, Okla., assignor to Phillips Petroleum Company, a corporation of Delaware
Filed Mar. 18, 1963, Ser. No. 265,693
2 Claims. (Cl. 324—10)

This invention relates to the determination of selected properties of earth formations penetrated by bore holes.

In oil exploration and recovery operations it is often useful to have information regarding geological strata penetrated by bore holes. One important property that can readily be measured to provide such information is the electrical resistivity of the formation. Different types of earth formations have different electrical resistivities so that a measurement of resistivities is of value in identifying particular formations. In other operations, valuable information regarding the intersected formations can be obtained by irradiating the formations and measuring radiation which is directed back into the bore hole.

The usual practice in well logging operations is to remove the drill string and lower a measuring device into the well. Such a procedure is somewhat time consuming and may not provide true information regarding formation properties. This is particularly true when porous formations are intersected because the drilling fluid may invade such formations quite rapidly. If this occurs, the resulting measurements are no longer representative of the original formation structure.

In accordance with one aspect of this invention, a system is provided for making resistivity measurements in wells during actual drilling operations or immediately thereafter. This is accomplished by use of a drill collar which has spaced electrodes mounted on the external surface thereof. The drill bit itself can serve as one of the electrodes. A current source and measuring apparatus are positioned in a casing which is lowered through the drill string to the region of the collar. In this manner, resistivity measurements are made without removing the drill string from the well.

In another embodiment of this invention, the drill collar is formed of a material which is capable of transmitting high energy radiation. A casing which contains a radiation source and detectors is lowered through the drill string to the region of the collar to permit measurements to be made while the drill string remains in the well.

Accordingly, it is an object of this invention to provide a system for making measurements in earth formations during drilling operations.

Another object is to provide novel apparatus for use in measuring electrical resistivities of formations intersected by bore holes.

A further object is to provide apparatus for logging wells by the use of penetrating radiation during drilling operations.

Other objects, advantages and features of the invention should become apparent from the following detailed description, taken in conjunction with the accompanying drawing in which.

Figure 1:
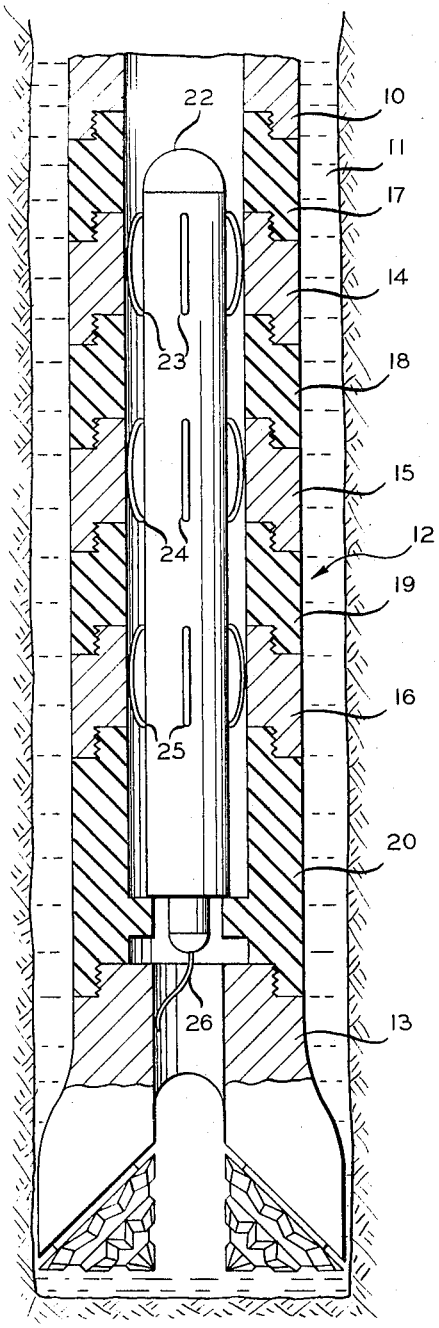
FIGURE 1 illustrates a first embodiment of the formation resistivity measuring apparatus of this invention.

Referring now to the drawing in detail and to FIGURE 1 in particular, the lower section 10 of a conventional drill string is shown disposed in a bore hole 11. A special drill collar assembly 12 attaches a drill bit 13 to drill string 10. The drill collar comprises three segments 14, 15 and 16 which are formed of an electrically conductive material. These segments are separated from one another and from drill string 10 and drill bit 13 by insulating segments 17, 18, 19 and 20. Various materials such as fiberglass reinforced resins can be employed for this purpose. Segment 20 is provided with one or more inner shoulders which support a casing 22, but permit passage of drilling fluid downwardly to bit 13.

Casing 22 is lowered into the drilling assembly whenever it is desired to make formation resistivity measurements. This can be accomplished by pumping the casing down into the well with the drilling fluid, or by the use of a cable, not shown. A plurality of guide springs 23, 24 and 25 are secured to casing 22 to center the casing within the drill collar. At least one of each of these groups of springs makes electrical contact with a respective segment of the drill collar. A conductive spring 26 extends from the lower end of casing 22 to engage drill bit 13. It should thus be apparent that drill bit 13 forms a first electrode and segments 14, 15 and 16 form second electrodes, these electrodes being insulated from one another and from drill bit 13.

Figure 2:
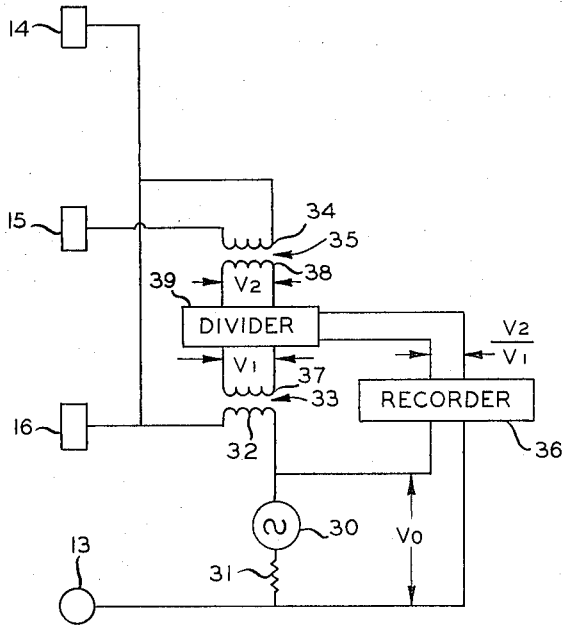
FIGURE 2 is a schematic circuit drawing of a first embodiment of the electrical components of the resistivity measuring apparatus.

The circuit elements associated with the electrodes are illustrated schematically in FIGURE 2. The apparatus of FIGURE 2 is positioned inside casing 22, and connections to the electrodes are made by the springs described above. The first terminal of an alternating current source 30 is connected through a resistor 31 to drill bit 13. The second terminal of current source 30 is connected through the primary winding 32 of a transformer 33 to electrodes 14 and 16. Transformer winding 32 is connected to electrode 15 through the primary winding 34 of a transformer 35. Drill bit 13 and the second terminal of current source 30 are connected to respective first input terminals of a recorder 36 which provides a record of the voltage $V_0$ across current source 30 and resistor 31. The secondary windings 37 and 38 of respective transformers 33 and 35 are connected to respective input terminals of a voltage dividing network 39. The output signal from this voltage dividing network is applied as the second input to record 36. This second input signal $V_2/V_1$ represents the ratio of the current flows through the primary windings of transformers 35 and 33.

The current emitted from drill bit 13 into the formation is maintained substantially constant by providing a relatively high resistor 31 in circuit with current source 30. In this manner, the voltage $V_0$ between the drill bit and the drill collar electrodes is proportional to the resistivity of the formation being drilled by the bit. This measured resistivity approximates the true resistivity of the formation being drilled because there is little time for the drilling mud to have penetrated into the formation at this point. The second signal $V_2/V_1$ applied to recorder 36 represents the resistivity measurement adjacent electrode 15. This measurement is made by comparing the current received at electrode 15 with the total current received by the three electrodes 15, 15 and 16. It should be evident that voltage $V_2$ is representative of the current received by electrode 15, while voltage $V_1$ is representative of the total current received by the three electrodes.

An important advantage of the system thus far described results from the fact that no wires are required to transmit signals to the surface. Current source 30 can be provided by a conventional battery which energizes a vibrator to establish an alternating current. Recorder 36 can be a battery operated magnetic recorder, for example. Dividing network 39 can be of the form illustrated in FIGURE 5 of U.S. Patent 2,916,691, for example. Casing 22 can be returned to the surface when the drill string is pulled from the well to change a drill bit or by reversing the circulation of the drilling fluid to pump the casing back to the surface.

Figure 3:
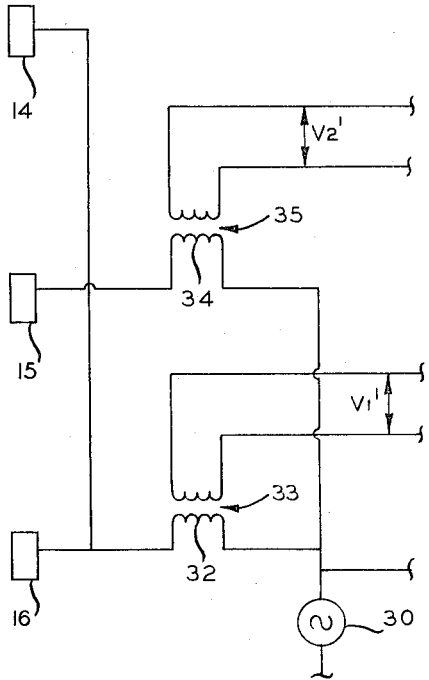
FIGURE 3 is a schematic circuit drawing of a modified form of the apparatus of FIGURE 2.

A second embodiment of a portion of the measuring circuit is illustrated schematically in FIGURE 3, the remainder of the circuit of FIGURE 3 being identical to FIGURE 2. In his particular embodiment, voltage $V_1'$ represents the total current received by electrodes 14 and 16. This is accomplished by connecting electrode 15 to current source 30 independently of transformer 33. The circuit is otherwise identical to that illustrated in FIGURE 2. The ratio of the current received by the center electrode to the current received by the outer electrodes also provides an indication of the formation resistivity adjacent electrode 15. In both FIGURE 2 and FIGURE 3, outer electrodes 14 and 16 serve as guard electrodes with respect to center electrode 15. Thus, the current received by electrode 15 is representative of the formation resistance at that region.

Figure 4:
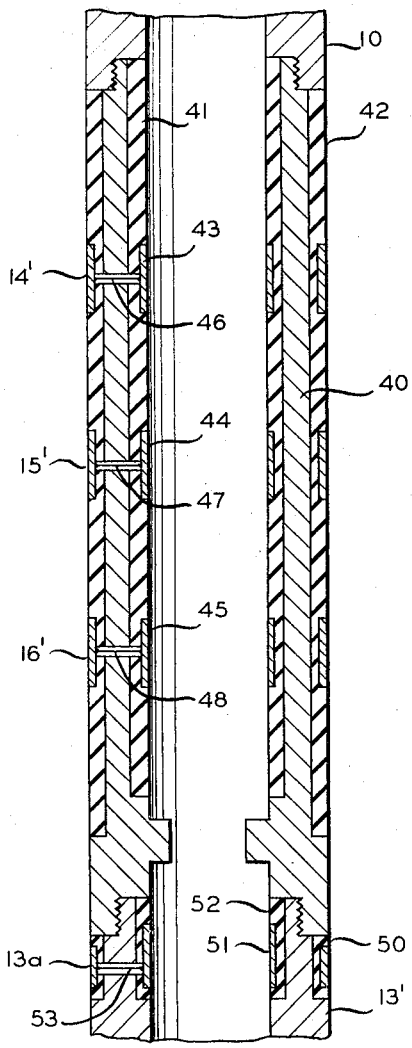
FIGURE 4 is an illustration of a second embodiment of electrode structure employed in measuring resistivity determinations.

A second embodiment of the electrode structure is illustrated in FIGURE 4. Drill string 10 and drill bit 13' are connected by a drill collar 40. Drill collar 40 is formed of metal to establish a rigid connection between the drill bit and the drill string. Collar 40 is provided with an inner sleeve 41 and an outer sleeve 42 of insulating material. Annular electrodes 14', 15' and 16' are imbedded in sleeve 42 in spaced relationship with one another. Annular commutator rings 43, 44 and 45 are imbedded in sleeve 41 adjacent representative electrodes 14', 15' and 16'. Conductors 46, 47 and 48 extend through openings in collar 40 to connect electrodes 14', 15' and 16' to their respective commutator rings. An annular electrode 13a is imbedded in an insulating sleeve 50 which is secured to the outer surface of drill bit 13'. A commutator ring 51 is imbedded in an insulating sleeve 52 on the inner surface of drill bit 13', and a conductor 53 connects electrode 13a with ring 51. It should be evident that casing 22 of FIGURE 1 can be inserted into the assembly of FIGURE 4 to connect the electrodes to the associated circuit elements inside the casing.

Figure 5:
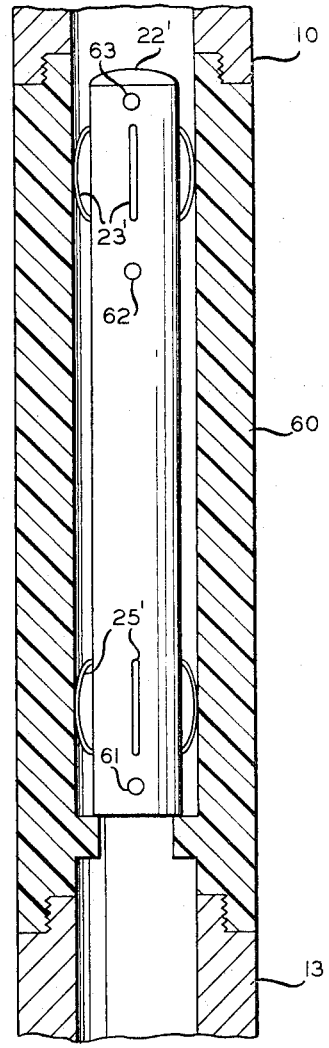
FIGURE 5 illustrates apparatus employed to make measurements of radiation.

FIGURE 5 illustrates an embodiment of this invention which is adapted to measure formation properties by the use of high energy radiation. Bit 13 is connected to drill string 10 by means of a collar 60. Collar 60 is formed of any suitable material which transmits high energy radiation. Various resins or low density metals can be employed for this purpose. Casing 22 carries a radiation source 61 and one or more detectors, such as 62 and 63. Radiation emitted from source 60 penetrates the formation, and the detectors pick up radiation returned from the formation. It is not intended that this invention be limited to any particular logging system since various procedures are known to those skilled in the art. For example, the formations can be irradiated with neutrons to form radioactive isotopes of various elements in the formations. The resulting gamma rays emitted from these elements can be measured by the detectors. The density of formations can be measured by directing a beam of gamma rays outwardly from source 61 and measuring reflected gamma rays which return to spaced detectors 62 and 63. Other measuring procedures can also be employed.

While this invention has been described in conjunction with presently preferred embodiments, it obviously is not limited thereto.

What is claimed is:
1. Apparatus for use in making electrical measurements in wells comprising a drill bit collar, a drill bit secured to said collar, three electrodes mounted on the exterior surface of said collar so as to be spaced vertically from one another when said collar is lowered into a well, said electrodes being insulated from one another and from said bit, an alternating current source, a resistance element connected between one terminal of said alternating current source and said bit, said resistance element having a resistance sufficiently large that a substantially constant current is emitted into surrounding formations from the drill bit when said apparatus is lowered into a well, a first transformer having one terminal of the primary coil thereof connected to the second terminal of said alternating current source, means connecting the second terminal of the primary coil of said first transformer to the outer two of said three electrodes, a second transformer having the primary coil thereof connected between the second terminal of said alternating current source and the center one of said three electrodes, means to measure the potential difference between the second terminal of said voltage source and said drill bit, and voltage dividing means connected to the secondary coils of said first and second transformers to divide the potential across the secondary coil of said second transformer by the potential across the secondary coil of said first transformer.

2. Apparatus for use in making electrical measurements in wells comprising a drill bit collar, a drill bit secured to said collar, three electrodes mounted on the exterior surface of said collar so as to be spaced vertically from one another when said collar is lowered into a well, said electrodes being insulated from one another and from said bit, an alternating current source, a resistance element connected between one terminal of said alternating current source and said bit, said resistance element having a resistance sufficiently large that a substantially constant current is emitted into surrounding formations from the drill bit when said apparatus is lowered into a well, a first transformer having one terminal of the primary coil thereof connected to the second terminal of said alternating current source, means connecting the second terminal of the primary coil of said first transformer to the outer two of said three electrodes, a second transformer having the primary coil thereof connected between the second terminal of the primary coil of said first transformer and the center one of said three electrodes, means to measure the potential difference between the second terminal of said voltage source and said drill bit, and voltage dividing means connected to the secondary coils of said first and second transformers to divide the potential across the secondary coil of said second transformer by the potential across the secondary coil of said first transformer.

References Cited by the Examiner
UNITED STATES PATENTS

| | | | |
|---|---|---|---|
| 2,349,366 | 5/1944 | Moon | 250—83.6 |
| 2,568,241 | 9/1951 | Martin | 324—1 X |
| 2,569,390 | 9/1951 | Sewell | 324—1 X |
| 2,650,067 | 8/1953 | Martin | 324—10 X |
| 2,670,442 | 2/1954 | Herzog | 250—83.6 |
| 2,707,768 | 5/1955 | Owen | 324—10 X |
| 2,921,253 | 1/1960 | Liben | 324—1 |
| 2,941,784 | 6/1960 | Martin | 324—10 |
| 3,047,795 | 7/1962 | Pearson | 324—10 |
| 3,065,404 | 11/1962 | Mayes et al. | 324—1 |
| 3,096,477 | 7/1963 | Smith et al. | 324—1 |
| 3,103,626 | 9/1963 | Burton et al. | 324—10 X |
| 3,134,069 | 5/1964 | Clements et al. | 324—10 |
| 3,149,490 | 9/1964 | Clements et al. | 324—10 X |

RUDOLPH V. ROLINEC, *Primary Examiner.*
FREDERICK M. STRADER, WALTER L. CARLSON,
*Examiners.*
G. R. STRECKER, *Assistant Examiner.*